(12) United States Patent
Aso et al.

(10) Patent No.: US 8,951,685 B2
(45) Date of Patent: Feb. 10, 2015

(54) FUEL CELL SYSTEM

(75) Inventors: Shinji Aso, Toyota (JP); Shigeto Kajiwara, Okazaki (JP); Naohisa Tsuchiya, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 706 days.

(21) Appl. No.: 12/741,782

(22) PCT Filed: Oct. 17, 2008

(86) PCT No.: PCT/JP2008/068870
§ 371 (c)(1),
(2), (4) Date: May 6, 2010

(87) PCT Pub. No.: WO2009/060706
PCT Pub. Date: May 14, 2009

(65) Prior Publication Data
US 2010/0291446 A1 Nov. 18, 2010

(30) Foreign Application Priority Data

Nov. 8, 2007 (JP) ................. 2007-290943
Dec. 18, 2007 (JP) ................. 2007-325496

(51) Int. Cl.
*H01M 8/04* (2006.01)
*B60L 11/18* (2006.01)
*H01M 8/10* (2006.01)

(52) U.S. Cl.
CPC ....... *H01M 8/04253* (2013.01); *B60L 11/1887* (2013.01); *B60L 11/1892* (2013.01); *B60L 11/1894* (2013.01); *H01M 8/04291* (2013.01); *H01M 8/04529* (2013.01); *H01M 8/04626* (2013.01); *H01M 8/04649* (2013.01); *H01M8/04828* (2013.01); *H01M 2008/1095* (2013.01); *Y02T 90/34* (2013.01); *Y02E 60/50* (2013.01)
USPC ......................................... 429/429

(58) Field of Classification Search
CPC .............. H01M 8/04119; H01M 8/04156; H01M 8/04298; H01M 8/04313; H01M 8/0432; H01M 8/04343; H01M 8/0435; H01M 8/04365; H01M 8/0469; H01M 8/04828; B60L 11/1887; B60L 11/1894
USPC .......................................... 429/413, 428–32
See application file for complete search history.

(56) References Cited

U.S. PATENT DOCUMENTS

| | | | |
|---|---|---|---|
| 6,524,733 B1 * | 2/2003 | Nonobe | 429/413 |
| 2003/0186093 A1 * | 10/2003 | St-Pierre et al. | 429/13 |
| 2004/0091761 A1 * | 5/2004 | Enjoji et al. | 429/32 |
| 2006/0121322 A1 * | 6/2006 | Haas et al. | 429/13 |
| 2009/0226770 A1 * | 9/2009 | Manabe et al. | 429/13 |

FOREIGN PATENT DOCUMENTS

| | | |
|---|---|---|
| JP | 2004-111196 A | 4/2004 |
| JP | 2005-108759 A | 4/2005 |
| JP | 2006-324066 A | 11/2006 |

\* cited by examiner

*Primary Examiner* — Ula C. Ruddock
*Assistant Examiner* — Lisa S Park Gehrke
(74) *Attorney, Agent, or Firm* — Kenyon & Kenyon LLP

(57) ABSTRACT

An object of the present invention is to reduce the period of time required to stop a fuel cell system and to suppress freezing of a fuel cell. The fuel cell system includes a controller that controls operations of a fuel cell, and the controller operates the fuel cell in a dry condition according to a state quantity (e.g., impedance) of the fuel cell in operation. The controller can operate the fuel cell in a dry condition before a system stop command is issued. In addition, the controller can switch an operation of the fuel cell from a dry condition to a wet condition when a required output of the fuel cell or a vehicle speed of a vehicle equals or exceeds a predetermined value.

4 Claims, 15 Drawing Sheets

US 8,951,685 B2

FUEL CELL SYSTEM

This is a 371 national phase application of PCT/JP2008/068870 filed 17 Oct. 2008, which claims priority to Japanese Patent Applications No. 2007-290943 filed 8 Nov. 2007, and No. 2007-325496 filed 18 Dec. 2007, respectively, the contents of which are incorporated herein by reference.

TECHNICAL FIELD

The present invention relates to a fuel cell system including a fuel cell, and in particular, to water content control of a fuel cell in operation.

BACKGROUND ART

In a fuel cell system, a fuel gas typified by hydrogen gas and an oxidation gas typified by air are supplied to a fuel cell. The fuel cell generates power by a power-generating reaction between the fuel gas and the oxidation gas, and generates water on an air electrode-side. With a proton-exchange membrane fuel cell, an electrolyte membrane is responsible for the conduction of protons during the reaction between the fuel gas and the oxidation gas. Therefore, in order to efficiently maintain the power-generating reaction, a moisture condition of the electrolyte membrane must be monitored and controlled at an appropriate state.

The proton-exchange membrane fuel cell is operated at approximately 60 to 80 degrees C. However, there may be cases where the fuel cell is used in sub-freezing environments. When the fuel cell is left in a shutdown state in a sub-freezing environment, the water content (generated water or water vapor) inside the fuel cell could freeze until a next system activation and, as a result, the next system activation could end up not being preferably performed or could take a prolonged period of time.

Japanese Patent Laid-Open No. 2004-111196 discloses a method for suppressing freezing of a fuel cell after shutdown. With this method, when shutdown conditions are satisfied, the supply of a fuel gas and an oxidation gas is stopped and an output current to be retrieved from the fuel cell is stopped. After the stoppage, dried fuel gas and dried oxidation gas (hereinafter referred to as "dried gases") are supplied to the fuel cell and a relatively small output current is retrieved from the fuel cell. Subsequently, the supply of the dried gases is stopped and the operation of the fuel cell is stopped.

DISCLOSURE OF THE INVENTION

Problems to be Solved by the Invention

However, such a freeze suppression method involves temporarily suspending retrieval of the output current from the fuel cell and subsequently once again retrieving the output current. As a result, a long period of time is required for the fuel cell system to finally come to a stop.

An object of the present invention is to provide a fuel cell system capable of reducing the period of time required to stop the fuel cell system and suppressing freezing of a fuel cell.

Means for Solving the Problems

In order to achieve the object described above, a fuel cell system according to the present invention includes a fuel cell and a controller that controls operations of the fuel cell, wherein the controller operates the fuel cell in a dry condition according to a state quantity of the fuel cell in operation.

According to this configuration, since the fuel cell can be operated at a dry condition from during operation of the fuel cell, the water content of the fuel cell can be reduced in advance. Accordingly, freezing of the fuel cell can be suppressed even without having to perform processing for reducing the water content in the fuel cell after a stop command of the fuel cell system is issued. Also, even if such processing is performed, since the period of time required by the processing can be reduced, the period of time required to stop the fuel cell system can be reduced. In addition, since the fuel cell can be operated in the dry condition according to the state quantity of the fuel cell in operation, operations conforming to a state of the fuel cell can be performed.

Preferably, the controller may operate the fuel cell in the dry condition before a system stop command is issued or, in other words, before a stop command of the fuel cell system is issued.

Such an arrangement enables the water content of the fuel cell to be reduced before the system stop command is issued. Accordingly, compared to a case where the fuel cell is operated in the dry condition after a system stop command is issued, the drying of the fuel cell after the system stop command is issued can be performed in a shorter period of time.

According to a preferable aspect of the present invention, the controller may switch the fuel cell from an operation in the dry condition to an operation in a wet condition when a required output of the fuel cell equals or exceeds a predetermined value.

As a result, the required power of the fuel cell system can be secured. The present invention is particularly useful when an operation of the fuel cell in the dry condition is performed in a state where the output of the fuel cell is being limited.

According to another preferable aspect of the present invention, the controller may switch the fuel cell from an operation in the dry condition to an operation in a wet condition when a movement speed of a moving object with the fuel cell system mounted thereon equals or exceeds a predetermined value.

As a result, a driving force of the moving object can be secured and a required movement speed of the moving object can be met. Note that "when a movement speed equals or exceeds a predetermined value" refers to, for example, a case where the speed of a moving object during deceleration reaches or exceeds a speed that enables the fuel cell to return to a dry condition.

Preferably, the state quantity of the fuel cell in operation described above may be an impedance of the fuel cell.

Accordingly, the moisture condition of the fuel cell can be grasped with a high degree of accuracy and a determination as to whether to operate the fuel cell in a dry condition or a wet condition can be suitably made.

Preferably, when an impedance target value is significantly deviated from a measured value thereof, the controller may operate the fuel cell in a dry condition by increasing the degree of dryness of the fuel cell in stages.

According to a preferable aspect of the present invention, the fuel cell system may further include a feeder that supplies an oxidation gas to the fuel cell, and the controller may include a measuring unit for measuring impedance. In addition, the controller may determine a water balance target value of the fuel cell for a dry condition based on a measured impedance and determine a target supply quantity of the oxidation gas to the fuel cell so that the target value is reached. In doing so, the controller may estimate a present water content of the fuel cell based on the measured impedance, correct the target supply quantity of the oxidation gas based on the water content, and control the feeder so that the corrected supply quantity is reached.

According to another preferable aspect of the present invention, the controller may include a measuring unit for measuring impedance and a calculating unit for calculating a water balance of the fuel cell. When the measuring unit is incapable of measuring impedance, the controller may estimate a water content of the fuel cell using a water balance calculated by the calculating unit and operates the fuel cell in a dry condition based on the estimated water content.

Accordingly, even if the impedance cannot be measured, a fail-safe in which the fuel cell can be operated in the dry condition can be achieved by estimating the water content of the fuel cell using the water balance.

More preferably, when estimating the water content of the fuel cell, the controller may use the impedance most recently measured by the measuring unit in addition to the water balance calculated by the calculating unit.

Accordingly, the accuracy of estimation of the water content of the fuel cell can be improved.

According to another preferable aspect of the present invention, the controller may prohibit operation of the fuel cell in the dry condition when the impedance cannot be measured.

As a result, it is possible to suppress control of the fuel cell that causes the fuel cell to enter a dry condition and which excessively dries the fuel cell in a state where it is unclear as to whether the fuel cell is in a wet condition or a dry condition.

Preferably, the fuel cell system may further include a timer for measuring an impedance measurement interval. The controller may prohibit an operation of the fuel cell in a dry condition when the measurement interval measured by the timer exceeds a threshold.

Accordingly, when the measurement interval does not exceed the threshold, the fuel cell can be operated in the dry condition based on the measured value on the understanding that the impedance can be normally measured. Meanwhile, when the measurement interval exceeds the threshold, an operation of the fuel cell in the dry condition can be prohibited on the understanding that the impedance cannot be normally measured. Such timer management enables excessive drying of the fuel cell to be suppressed.

Preferably, when the impedance cannot be measured, the controller may switch the operation of the fuel cell from a dry condition to a normal condition.

Accordingly, an operation in the dry condition can be avoided and a water content condition of the fuel cell can be returned to normal.

Here, there are many methods for changing an operating condition of the fuel cell to a dry condition or a wet condition. For example, the fuel cell can be changed to a dry condition by limiting an electric-generating capacity of the fuel cell, a rise in temperature, or a reduction in cooling quantity due to a coolant. In addition, the operating condition of the fuel cell can be changed to a dry condition or a wet condition by varying a flow rate, pressure, temperature, or dew-point temperature of the oxidation gas or a flow rate, pressure, purge frequency or dew-point temperature of the fuel gas.

BEST MODE FOR CARRYING OUT THE INVENTION

Hereinafter, a fuel cell system according to a preferable embodiment of the present invention will be described with reference to the attached drawings.

As illustrated in FIG. 1, a fuel cell system 1 according to the present embodiment can be mounted on a vehicle 100 that is a fuel-cell hybrid vehicle (FCHV), an electrical vehicle, a hybrid vehicle, or the like. However, the fuel cell system 1 is also applicable to various moving objects other than the vehicle 100 (for example, a ship, an airplane, or a robot) and to stationary power sources.

The fuel cell system 1 includes a fuel cell 2, an oxidation gas piping system 3 that supplies air as an oxidation gas to the fuel cell 2, a fuel gas piping system 4 that supplies hydrogen gas as a fuel gas to the fuel cell 2, a coolant piping system 5 that supplies a coolant to the fuel cell 2, a power system 6 that charges/discharges power of the system 1, and a controller 7 that integrally controls operations of the system 1. The oxidation gas and the fuel gas can generically be referred to as a reactant gas.

The fuel cell 2 is composed of, for example, a proton-exchange membrane fuel cell and includes a stack structure in which a large number of single cells are stacked. A single cell includes an air electrode on one face of an electrolyte made of an ion-exchange membrane and a fuel electrode on the other face of the electrolyte, and a pair of separators that sandwich the air electrode and the fuel electrode from both sides. The oxidation gas is supplied to an oxidation gas flow channel 2a of one of the separators, while the fuel gas is supplied to a fuel gas flow channel 2b of the other separator. The fuel cell 2 generates power due to an electrochemical reaction between the supplied fuel gas and oxidation gas. The electrochemical reaction at the fuel cell 2 is an exothermic reaction and the proton-exchange membrane fuel cell 2 reaches a temperature of approximately 60 to 80 degrees C. during operation.

The oxidation gas piping system 3 includes a supply channel 11 and an exhaust channel 12. The oxidation gas supplied to the fuel cell 2 flows through the supply channel 11. An oxidation off-gas discharged from the fuel cell 2 flows through the exhaust channel 12. The oxidation off-gas contains moisture generated by the cell reaction of the fuel cell 2 and is therefore in a high moisture condition.

The supply channel 11 is provided with a compressor 14 and a humidifier 15. The compressor 14 is a feeder that takes in outside air via an air cleaner 13 and feeds the air under pressure to the fuel cell 2. The humidifier 15 performs a moisture exchange between the oxidation gas flowing through the supply channel 11 in a low moisture condition and the oxidation off-gas flowing through the exhaust channel 12 in the high moisture condition, and appropriately humidifies the oxidation gas to be supplied to the fuel cell 2. A back-pressure regulating valve 16 regulates a back pressure on an air electrode-side of the fuel cell 2. The back-pressure regulating valve 16 is arranged near an air electrode outlet of the exhaust channel 12. A pressure sensor P1 that detects the pressure inside the exhaust channel 12 is provided in the vicinity of the back-pressure regulating valve 16. The oxidation off-gas is ultimately discharged as exhaust gas into the air outside of the system via the back-pressure regulating valve 16 and the humidifier 15.

The fuel gas piping system 4 includes a hydrogen supply source 21, a supply channel 22 through which hydrogen gas supplied from the hydrogen supply source 21 to the fuel cell 2 flows, a circulation channel 23 for returning hydrogen off-gas discharged from the fuel cell 2 to a junction A of the supply channel 22, a pump 24 for pressure-feeding the hydrogen off-gas in the circulation channel 23 to the supply channel 22, and a purge channel 25 branched from the circulation channel 23. When a source valve 26 is opened, the hydrogen gas flowing from the hydrogen supply source 21 to the supply channel 22 is supplied to the fuel cell 2 via a regulator valve 27 and other pressure reducing valves, and via a shutoff valve 28. A purge valve 33 for discharging hydrogen off-gas to a hydrogen diluter (not illustrated) is provided in the purge channel 25.

The coolant piping system 5 includes a coolant flow channel 41 that communicates with a cooling flow channel 2c in the fuel cell 2, a cooling pump 42 provided in the coolant flow channel 41, a radiator 43 that cools a coolant discharged from the fuel cell 2, a bypass flow channel 44 that bypasses the radiator 43, and a switching valve 45 for setting passage flow of cooling water to the radiator 43 and the bypass flow channel 44. The coolant flow channel 41 includes a temperature sensor 46 provided near a coolant inlet of the fuel cell 2 and a temperature sensor 47 provided near a coolant outlet of the fuel cell 2.

The cooling pump 42 is motor-driven to circulate the coolant in the coolant flow channel 41 with respect to the fuel cell 2. The coolant temperature detected by the temperature sensor 47 reflects an internal temperature of the fuel cell 2 or, in other words, an intra-cell temperature (hereinafter referred to as an "FC temperature"). Alternatively, a temperature sensor may be separately provided to directly detect the temperature of the fuel cell 2. The switching valve 45 comprises, for example, a rotary valve.

The power system 6 includes a high-voltage DC/DC converter 61, a battery 62, a traction inverter 63, a traction motor 64, and auxiliary inverters 65, 66, and 67 of various types. The high-voltage DC/DC converter 61 is a direct-current voltage converter and includes a function for regulating a direct-current voltage inputted from the battery 62 and outputting the direct-current voltage to the side of the traction inverter 63, and a function for regulating a direct-current voltage inputted from the fuel cell 2 or the traction motor 64 and outputting the direct-current voltage to the battery 62. Charging/discharging of the battery 62 is realized by these functions of the high-voltage DC/DC converter 61. In addition, an output voltage of the fuel cell 2 is controlled by the high-voltage DC/DC converter 61.

The traction inverter 63 converts a direct current into a three-phase alternating current and supplies the three-phase alternating current to the traction motor 64. The traction motor 64 is, for example, a three-phase alternating current motor. The traction motor 64 constitutes a primary power source of the vehicle 100 with the fuel cell system 1 mounted thereon, and is coupled to wheels 101L and 101R of the vehicle 100. The auxiliary inverters 65, 66, and 67 respectively control the driving of the motors of the compressor 14, the pump 24, and the cooling pump 42.

The controller 7 is configured as a microcomputer internally provided with a CPU, a ROM, and a RAM. The CPU executes desired computation according to a control program and performs various processing and control such as water content control of the fuel cell 2. The ROM stores control programs and control data to be processed by the CPU. The RAM is primarily used as various work regions for control and processing.

The controller 7 receives, as input, detection signals from various sensors including the pressure sensor (P1), the temperature sensors (46 and 47), a voltage sensor, a current sensor, an accelerator opening sensor, an ambient air temperature sensor 71, and a velocity sensor 75. The accelerator opening sensor detects an accelerator opening of the vehicle 100. The ambient air temperature sensor 71 detects an outside air temperature of the environment where the fuel cell system 1 is disposed. The velocity sensor 75 detects a traveling speed (movement speed) of the vehicle 100. The controller 7 receives input of detection signals from these sensors and outputs control signals to the various components of the fuel cell system 1.

As function blocks for realizing water content control of the fuel cell 2, the controller 7 includes a storage unit 121, an impedance measuring unit 122, a water balance calculating unit 123, and an operation control unit 125. The storage unit 121 stores various programs for realizing water content control of the fuel cell 2 as well as various maps, to be described later. The various maps are obtained in advance either experimentally or through simulations.

The impedance measuring unit 122 measures a present impedance of the fuel cell 2 using, for example, an alternating current impedance method. By measuring the impedance of the fuel cell 2, a water content of the fuel cell 2 can be estimated. In other words, it is possible to grasp whether the fuel cell 2 is in a dry condition or a wet condition based on a measurement result of the impedance measuring unit 122. The impedance measuring unit 122 measures the impedance of the fuel cell 2 based on a superimposed sine-wave signal using a known method.

The water balance calculating unit 123 calculates a water balance W of the fuel cell 2. A water balance W can be calculated from an influent water quantity Wx to the fuel cell 2, an exhaust water quantity Wy from the fuel cell 2, and a generated water quantity Wz by the fuel cell 2. A relational expression thereof can be expressed as follows.

$$W = Wx - Wy + Wz$$

The water balance W is any of a water balance of the entire fuel cell 2, a water balance on the air electrode-side of the fuel cell 2, or a water balance on the fuel electrode-side of the fuel cell 2. Preferably, the water balance W is either the water balance of the entire fuel cell 2 or a water balance on the air electrode-side of the fuel cell 2.

For example, regarding the water balance of the entire fuel cell 2, the influent water quantity Wx is a water quantity contained in the oxidation gas and the fuel gas to be supplied to the fuel cell 2 and can be calculated from a supply flow rate, a supply pressure, and a humidity of the reactant gas. In addition, the exhaust water quantity Wy is a water quantity contained in the oxidation gas and the fuel gas discharged from the fuel cell 2 and can be calculated from an exhaust flow rate, a back pressure, and a humidity of the reactant gas. The generated water quantity Wz is a water quantity generated by electrical power generation of the fuel cell 2 and can be calculated by an electric-generating capacity (voltage, current) of the fuel cell 2 that is in a correlative relationship.

The operation control unit 125 controls operations of the fuel cell 2 based on results from the impedance measuring unit 122, the water balance calculating unit 123, and the like. More specifically, the operation control unit 125 transmits control commands to the various components (the compressor 14, the back-pressure regulating valve 16, the pump 24, the purge valve 33, the cooling pump 42, the switching valve 45, a cooling fan for the radiator 43, the high-voltage DC/DC converter 61, and the like), and controls the operation of the fuel cell 2 so as to achieve a desired operating condition.

Next, a plurality of examples of water content control of the fuel cell 2 by the controller 7 will be described.

First Control Example

As illustrated in FIG. 2, first, the fuel cell system 1 is executing a normal operation of the fuel cell 2 (step S1). In this case, in the normal operation, the fuel cell 2 is operated (electric power is generated) in a state where an air stoichiometric ratio is set equal to or greater than 1.0 (theoretical value) so as to suppress power loss and obtain a high generating efficiency. An air stoichiometric ratio refers to an excess oxygen rate indicating how much supplied oxygen is in excess with respect to a just proportion of oxygen for reacting with hydrogen.

Next, during a normal operation, the impedance of the fuel cell 2 is measured by the impedance measuring unit 122 (step S2). Based on the measured impedance, a present water content of the fuel cell 2 is estimated as a state quantity of the fuel cell 2 in operation. The estimation is performed using, for example, a map indicating a correlative relationship between impedance and water content. The map is to be stored in the storage unit 121. According to the estimated water content, a determination is made as to whether or not to operate the fuel cell 2 in a dry condition (step S3). When the fuel cell 2 does not require drying (step S3: No), the process is exited and the normal operation of the fuel cell 2 is continued. On the other hand, when the fuel cell 2 needs to be dried (step S3: Yes), a dry operation is executed by the operation control unit 125 (step S4).

Here, the dry operation refers to operating the inside of the fuel cell 2 at a rather dry state while having the fuel cell 2 output a required output set by various parameters. In other words, the dry operation is an operation in which the water content of the fuel cell 2 is reduced in comparison to the normal operation. A dry operation need not necessarily bring down the humidity inside the fuel cell 2 (electrolyte membrane, diffusion layer, and flow channels) to 0% and need only reduce the water content. When the dry operation is executed, for example, the electrolyte membrane becomes rather dry compared to the normal operation. The dry operation can be executed under various methods by using a control parameter value that differs from a value used during the normal operation.

Specifically, in a first example, the dry operation is executed by raising the FC temperature in comparison to the normal operation. This can be realized by, for example, a self-heating operation or a reduced cooling quantity of the fuel cell 2. Self-heating of the fuel cell 2 can be executed by, for example, performing a low efficiency operation. A reduction in the cooling quantity of the fuel cell 2 can be executed by, for example, controlling a rotation speed of the cooling pump 42 and/or a rotation speed of a cooling fan of the radiator 43 in a state where the fuel cell 2 is being electrically generated so as to suppress the cooling quantity due to the radiator 43, or by switching the switching valve 45 to the side of the bypass flow channel 44. By performing such dry operation, evaporation of the moisture retained in the fuel cell 2 can be promoted and the evaporated moisture can be carried away by the oxidation off-gas or the fuel off-gas.

In a second example, the dry operation is executed by changing, in comparison to the normal operation, at least one of the flow rate, pressure, temperature, and dew-point temperature of the oxidation gas. Specifically, the dry operation is performed by increasing a supply flow rate of the oxidation gas by increasing the rotation speed of the compressor 14, lowering a supply pressure of the oxidation gas by regulating the opening of the back-pressure regulating valve 16, raising the temperature of the oxidation gas with an external heater, not illustrated, or lowering t dew-point temperature. Moreover, in the dry operation, the oxidation gas may be supplied to the fuel cell 2 by bypassing the humidifier 15, or control may be performed so as to reduce a humidified quantity of the oxidation gas by the humidifier.

In a third example, the dry operation is executed by changing, in comparison to the normal operation, at least one of the flow rate, pressure, the purge frequency, and dew-point temperature of the fuel gas. Specifically, the dry operation is performed by increasing a flow rate of the fuel gas by regulating the pump 24 and/or an injector, not illustrated, lowering a supply pressure of the fuel gas by regulating the regulator 28 or the injector, increasing the purge frequency of the purge valve 33, or lowering the dew-point temperature.

Note that, while the dry operation can be executed by combining, as appropriate, the first to third examples described above, the second example can dry the fuel cell 2 more effectively than the third example. This is due to the fact that the fuel gas piping system 4 includes a circulating system and is therefore less responsive to a change in a control parameter than the oxidation gas piping system 3. As a method with a particularly high responsiveness, a method using an increase in the supply flow rate of oxidation gas is preferably used.

The dry operation such as those described above is executed in step S4 and the water content of the fuel cell 2 is reduced in comparison to during normal operation. Subsequently, a presence/absence of a system stop command from a user (operator) is determined (step S5). The system stop command refers to a command that stops an operation of the fuel cell system 1. For example, when the system stop command is not issued within a predetermined period of time after changing a control parameter for the dry operation (step S5: No), an impedance measurement (step S2) is once again executed and feedback control is performed. On the other hand, when the system stop command has been issued (step S5: Yes), the system stop command acts as a trigger and switching is performed from the dry operation to a scavenging operation (step S6).

Here, the scavenging operation refers to scavenging the inside of the fuel cell 2 upon the end of operation of the fuel cell system 2 (upon system stoppage) by completely or approximately completely discharging the moisture inside the fuel cell 2 to the outside. The scavenging operation is performed by, for example, supplying oxidation gas to the oxidation gas flow channel 2a by the compressor 14 and carrying away moisture remaining in the fuel cell 2 using the oxidation gas in a state where the fuel cell 2 is in an idle operation or a state where the supply of hydrogen gas to the fuel cell 2 has been stopped. Accordingly, the electrolyte membrane or the electrodes of the fuel cell 2 change to a dry state. Subsequently, the fuel cell system 1 is stopped and stands by for a next activation.

As described above, according to the first control example, since the fuel cell 2 is operated in the dry condition according to the water content that is a state quantity of the fuel cell 2 in operation, the water content can be reduced before the system stop command is issued. Accordingly, the fuel cell 2 can be scavenged (dried) in a short period of time after the system stop command is issued, and the period of time required to stop the fuel cell system 1 can be reduced and the power required to dry the fuel cell 2 can be saved. In addition, freezing of the fuel cell 2 after the system stop command is issued can be suppressed and the fuel cell 2 can be stably activated even if the next system activation occurs at a sub-freezing temperature. Furthermore, since the fuel cell 2 is operated in the dry condition according to a state quantity of the fuel cell 2 in operation, an operation conforming to the state of the fuel cell 2 can be performed.

Note that, whether or not to switch the fuel cell 2 from the normal operation to the dry operation can be determined in advance depending on a usage environment or a usage period of the vehicle 100. For example, in areas or during periods when freezing of the fuel cell 2 does not occur, dry operations of the fuel cell 2 may be uniformly arranged so as not to be performed before the system stop command is issued. For example, in winter, the flow illustrated in FIG. 2 can be executed as a water content control of the fuel cell 2, while in summer and in other seasons, the flow illustrated in FIG. 2 is not executed and the fuel cell system 1 can terminates without performing dry operations of the fuel cell 2. Another example would be executing the flow illustrated in FIG. 2 as a water content control of the fuel cell 2 when the temperature detected by the ambient air temperature sensor 71 is equal to or lower than, for example, 0 degrees C., and not executing the flow illustrated in FIG. 2 when the detected temperature is higher than 0 degrees C.

Second Control Example

Next, a second control example will be described with reference to FIG. 3. The difference from the first control example is that steps S14 and S15 have been added. Since steps S11 to S13 and S16 to S18 are the same as steps S1 to S6 in FIG. 2, descriptions thereof will be omitted.

In step S14, the controller 7 determines whether or not the impedance measured value in step S12 is significantly deviated from an impedance target value. In this case, the impedance target value refers to a target value for operating the fuel cell 2 in the dry condition and which is stored in the storage unit 121.

When the difference between the impedance measured value and the impedance target value is equal to or greater than a threshold (step S14: Yes), the dry operation is executed while raising the degree of dryness of the fuel cell 2 in stages (step S15). For example, the supply flow rate of oxidation gas is increased in stages up to a target value thereof. On the other hand, when the difference between the impedance measured value and the impedance target value is smaller than the threshold (step S14: No), the dry operation is executed without changing the degree of dryness (step S16) as is the case with the first control example.

As described above, according to the second control example, in addition to operations and effects achieved by the first control example, dry operations can be executed while changing degrees of dryness as required. By executing the dry operation by gradually increasing the degree of dryness as described above, the impedance of the fuel cell 2 can be swiftly approximated to a target value. In addition, while departures in sound, fuel consumption, and the increase as the degree of dryness is elevated, control in stages enables a reduction in such departures.

Third Control Example

Next, a third control example will be described with reference to FIG. 4. A difference from the first control example is that an attempt is made to resolve departures due to an operation in the dry condition in conformance to the circumstances. Therefore, in the third control example, required output determination (step S25) and wetness control (step S26) are added to the first control example. Since steps S21 to S24 and S27 to S28 are the same as steps S1 to S6 in FIG. 2, descriptions thereof will be omitted.

During the execution of the dry operation (step S24), the controller 7 determines whether or not the required output of the fuel cell 2 is equal to or greater than a threshold (step S25). The "threshold" can be set to, for example, half of a maximum output of the fuel cell 2 or an output that enables the vehicle 100 to travel at 60 km per hour. Although a criterion of determination has been set to a required output of the fuel cell 2, a rate of increase of the required output of the fuel cell 2, an accelerator opening, or a required output of the entire fuel cell system 1 can alternatively be set as the criterion of determination.

If the required output of the fuel cell 2 is lower than the threshold (step S25: No), the dry operation is continued because the required output of the fuel cell 2 can be satisfied even by the dry operation. On the other hand, if the required output of the fuel cell 2 is equal to or greater than the threshold (step S25: Yes), the dry operation is unable to satisfy the required output of the fuel cell 2. For example, when the vehicle 100 accelerates during the execution of the dry operation, the required output of the fuel cell 2 may exceed a generatable output of the fuel cell 2 during the dry operation. In such a case (step S25: Yes), the operation of the fuel cell 2 is switched from the dry condition to a wet condition (step S26).

The wetness control performed in step S26 refers to control that enables operation so that the inside of the fuel cell 2 becomes rather wet or, in other words, increasing the water content of the fuel cell 2 as compared to the normal operation or the dry operation. The wetness control is realized by executing an operation that is the opposite of the second or third example of the dry operation described above. For example, the amount of moisture carried away by the off-gas of the reactant gas (oxidation off-gas or fuel off-gas) is reduced by lowering the supply flow rate of the oxidation gas, raising the supply pressure of the oxidation gas, or lowering the FC temperature. Subsequently, a determination as to whether or not to operate the fuel cell 2 in the dry condition is made according to a re-acquired impedance (step S23).

As described above, according to the third control example, a wetness control of the fuel cell 2 is performed when the required output of the fuel cell 2 during the dry operation equals or exceeds a threshold (equals or exceeds a predetermined value). Accordingly, the output of the fuel cell 2 can be swiftly restored and a required power of the fuel cell system 1 can be secured. In another embodiment, a rate of increase of the required output of the fuel cell 2 can be compared to the threshold in step S25. In addition, in the third control example, the degree of dryness can be controlled in stages (FIG. 23: steps S14 and S15) in the same manner as in the second control example.

Fourth Control Example

Next, a fourth control example will be described with reference to FIG. 5. A difference from the third control example is that by performing a vehicle speed determination (step S35) instead of the required output determination (step S25), an attempt is made to resolve departures due to an operation in the dry condition in conformance to the circumstances. Since steps S31 to S34 and S36 to S38 are the same as steps S21 to S24 and S26 to S28 in FIG. 4, descriptions thereof will be omitted.

In step S35, the controller 7 determines whether or not the traveling speed (i.e., vehicle speed) of the vehicle 100 is equal to or greater than a threshold. The traveling speed of the vehicle 100 is detected by the velocity sensor 75 described earlier. The threshold is preferably set to a relatively high velocity value such as 80 km/h or 100 km/h. Preferably, as will be described later, the threshold is set so as to equal or exceed a speed that enables a period of time needed by the fuel cell 2 to return to the dry condition to be secured during deceleration of the vehicle 100.

When the vehicle speed is lower than the threshold (step S35: No), the operation of the fuel cell 2 in the dry condition is continued. This is because the required output level of the fuel cell 2 can be satisfied even in the dry condition.

On the other hand, if the vehicle speed is equal to or greater than the threshold (step S35: Yes), the operation of the fuel cell 2 is switched from the dry condition to the wet condition (step S36). This is because there may be cases where the required output level of the fuel cell 2 exceeds the output of the fuel cell 2 that can be generated during a dry operation. In addition, even if wetness control is performed, it would take a certain amount of time for the vehicle 100 to decelerate and stop if the vehicle 100 is traveling at a somewhat high speed. Therefore, the operation can be once again switched to the dry condition and executed during the time until the vehicle 100 stops. Accordingly, if the vehicle speed is equal to or greater than the threshold (step S35: Yes), wetness control of the fuel cell 2 is preferably performed (step S36).

As described above, according to the fourth example, the output of the fuel cell 2 can be swiftly restored and a required power of the traction motor 64 can be satisfied in a similar manner to the third control example.

Fifth Control Example

Next, a fifth control example will be described with reference to FIGS. 6 to 9. The present control example relates to a specific control for an operation that maintains a high impedance of the fuel cell 2 or, in other words, an operation in the dry condition. The fifth control example is performed in, for example, step S4 in FIG. 2.

As illustrated in FIG. 6, the controller 7 performs a computation enclosed by the dotted frame border 200 based on an impedance measured value $Z_A$ and determines an air flow rate command value suitable for an operation in a dry condition. Here, the impedance measured value $Z_A$ is a value measured by the impedance measuring unit 122. An air flow rate command value is a command value of a supply flow rate of the oxidation gas by the compressor 14. Hereinafter, an air flow rate shall refer to a supply flow rate of the oxidation gas to the fuel cell 2.

First, an averaging operation is performed on the impedance measured value $Z_A$. Consequently, hunting of the air flow rate can be prevented. Next, the impedance measured value $Z_A$ is introduced to a first line 201 and a second line 210.

At the first line 201, first, a target water balance $W_0$ is obtained from the impedance measured value $Z_A$ using a water balance target map 202. Then, a target air flow rate $F_1$ is obtained from the target water balance $W_0$ using an air flow rate target map 203.

FIG. 7 is a diagram illustrating the water balance target map 202. The water balance target map 202 indicates a relationship between the impedance of the fuel cell 2 and a water balance target value on the air electrode-side of the fuel cell 2, and is stored in the storage unit 121. The further right on the abscissa of the water balance target map 202, the more the target water balance assumes a wet condition, indicating that a present moisture condition of the fuel cell 2 is a dry condition. On the other hand, the further left on the abscissa of the water balance target map 202, the more the target water balance assumes a dry condition, indicating that the present moisture condition of the fuel cell 2 is a wet condition.

In the example illustrated in FIG. 7, the impedance measured value $Z_A$ is lower than an impedance target value $Z_0$ suitable for a normal operation and the fuel cell 2 is in a wet state. As is apparent from FIG. 7, the target water balance $W_0$ can be unambiguously calculated by applying the impedance measured value $Z_A$ to a control line $L_1$.

FIG. 8 is a diagram illustrating the air flow rate target map 203. The air flow rate target map 203 indicates a relationship among a target air flow rate, a current of the fuel cell 2 (hereinafter referred to as an "FC current"), and a water balance, and is stored in the storage unit 121. A plurality of air flow rate target maps 203 is prepared in, correspondence to combinations of temperatures of the fuel cell 2 and back pressures on the air electrode-side. Here, as an example, three equivalent water balance lines (water balance $W_0$, water balance $W_1$, and water balance $W_2$) are illustrated in a case where the FC temperature is 70 degrees C. and the back pressure on the air electrode-side of the fuel cell 2 is 120 kPa.

In the present control example, when a current sensor measures a present current value $I_1$ of the fuel cell 2, a target air flow rate $F_1$ is unambiguously calculated from the relationship between the current value $I_1$ and the target water balance $W_0$ calculated earlier.

Next, the second line 210 will be described.

At the second line 210, first, an estimated water content $X_1$ is obtained from the impedance measured value $Z_A$ using a water content estimation map 205.

FIG. 9 is a diagram illustrating the water content estimation map 205. The water content estimation map 205 indicates a relationship between the impedance and the water content of the fuel cell 2, and is stored in the storage unit 121. Impedance and water content have a correlative relationship such as that depicted by a curve M1. A plurality of water content estimation maps 205 is prepared in correspondence to temperatures of the fuel cell 2. In the present control example, a present water content of the fuel cell 2 is estimated to be $X_1$ from the impedance measured value A.

Returning now to FIG. 6, as illustrated therein, after obtaining the estimated water content $X_1$, the controller 7 differentiates the estimated water content $X_1$ with respect to time (FIG. 6: reference character 206) to obtain a water balance (water balance monitored value $Y_1$) of the entire fuel cell 2. Subsequently, a PI computation is performed with the water balance monitored value $Y_1$ as an actuating signal and a correction air flow rate $F_2$ is calculated. Next, the correction air flow rate $F_2$ is added to the target air flow rate $F_1$ by an adder 204 to correct the target air flow rate. The corrected target air flow rate ($F_1+F_2$) is inputted to the compressor 14 as an air flow rate command value.

As described above, according to the fifth control example, since the impedance can be measured as a state quantity of the fuel cell 2 in operation and the compressor 14 can be controlled by the air flow rate command value based on the measurement result, the fuel cell 2 can be preferably operated in the dry condition. Therefore, in a similar manner as described earlier, the fuel cell 2 can be scavenged (dried) in a short period of time after the system stop command is issued, and variances in scavenging times can be reduced.

Sixth Control Example

Next, a sixth control example will be described with reference to FIG. 10. The present control example relates to a specific control for operating the fuel cell 2 in the dry condition in a case where, for some reason, the impedance of the fuel cell 2 cannot be measured. The sixth control example is an exception handling performed in place of the fifth control example and is performed in, for example, step S4 in FIG. 2. A case where the impedance of the fuel cell 2 cannot be measured is when, for example, a sine-wave signal for impedance measurement cannot be superimposed onto the power system 6.

As illustrated in FIG. 10, the controller 7 first estimates a water content $X_b$ of the fuel cell 2 from a newest impedance measured value $Z_b$ using a water content estimation map 221. The water content estimation map 221 is similar to the map illustrated in FIG. 9 and is defined by a curve M2 depicting a correlative relationship between an impedance and a water content of the fuel cell 2 corresponding to a predetermined temperature. In this case, the newest impedance measured value $Z_b$ refers to an impedance most recently measured by the impedance measuring unit 122.

In addition, the water balance calculating unit 123 of the controller 7 performs a water balance calculation 222. Consequently, for example, a water balance $W_b$ on the air electrode-side of the fuel cell 2 can be calculated from an air flow rate, an air back pressure (a back pressure on the air electrode-side), and an FC voltage (an output voltage of the fuel cell 2). Next, the estimated water content $X_b$ is added to the water balance $W_b$ by an adder 223 and an estimated water content of the fuel cell 2 is calculated. Subsequently, a water content estimation map 224 is used to estimate that the present impedance of the fuel cell 2 takes a value of $Z_c$ from the estimated water content $X_c$. The water content estimation map 224 is similar to the map illustrated in FIG. 9 and is defined by a curve M3 depicting a correlative relationship between an impedance and a water content of the fuel cell 2 corresponding to a predetermined temperature.

Subsequently, the estimated impedance $Z_c$ is introduced to the first line 201 illustrated in FIG. 6. As a result, the controller 7 obtains a target water balance $W_o$ from the estimated impedance $Z_c$ using the water balance target map 202, and then obtains a target air flow rate $F_1$ from the target water balance $W_o$ using the air flow rate target map 203. The controller 7 then controls the compressor 14 so that the target air flow rate $F_1$ is supplied to the fuel cell 2 and operates the fuel cell 2 in the dry condition.

As described above, according to the present control example, even if the impedance cannot be measured, the water content of the fuel cell 2 can be estimated as a value that is accurate as possible by using the water balance and the newest impedance measured value $Z_b$. Accordingly, the fuel cell 2 can be operated in the dry condition and fail-safe can be achieved.

Seventh Control Example

Next, a seventh control example will be described with reference to FIGS. 11 to 13. Contrary to the fifth control example, the present control example relates to a specific control for an operation that maintains a low impedance of the fuel cell 2 or, in other words, an operation in the wet condition. The seventh control example is performed in, for example, step S26 in FIG. 4 and in step S36 in FIG. 5.

In the seventh control example, processing similar to that performed in the fifth control example and illustrated in FIG. 6 is performed. Specifically, after being subjected to an averaging operation, an impedance measured value $Z_c$ is introduced to a first line 301 and a second line 310. At the first line 301, first, a water balance target map 302 illustrated in FIG. 12 is used to apply the impedance measured value $Z_c$ to a control line $L_1$ and a target water balance $W_3$ for a wet condition is calculated. Next, a air back pressure target map 303 illustrated in FIG. 13 is used to calculate a target air back pressure $P_a$ from the relationship between the present FC current $I_1$ and the target water balance $W_3$ described above.

The water balance target map 302 is the same as the water balance target map 202 illustrated in FIG. 7. On the other hand, the air back pressure target map 303 indicates a relationship among a target air back pressure, an FC current, and a water balance, and a plurality thereof corresponding to combinations of temperatures and air flow rates of the fuel cell 2 is stored in the storage unit 121. Here, as an example, three equivalent water balance lines (water balance $W_3$, water balance $W_4$, and water balance $W_5$) are shown.

At the second line 310, first, an estimated water content $X_1$ is obtained from the impedance measured value $Z_c$ using the water content estimation map 205 illustrated in FIG. 9. Subsequently, the controller 7 obtains a water balance monitored value $Y_1$ by differentiating the estimated water content $X_1$ with respect to time, and performs a PI computation on the water balance monitored value $Y_1$ to calculate a correction air back pressure $P_b$. Next, the correction air back pressure $P_b$ is added to the target air back pressure $P_a$ by an adder 304 to correct the target air back pressure, and the corrected target air back pressure $(P_a + P_b)$ is inputted to the back-pressure regulating valve 16 as an air back pressure command value.

As described above, according to the seventh control example, since the back-pressure regulating valve 16 can be controlled by the air back pressure command value based on the impedance of the fuel cell 2, the fuel cell 2 can be preferably operated in the wet condition. While other methods such as reducing the air flow rate can be adopted to perform wetness control, regulating the air back pressure as described above provides a high responsiveness and is therefore preferable.

Note that, while a detailed description will not be provided, when the impedance cannot be measured in the present control example, the impedance is preferably estimated by the method described in the sixth control example (FIG. 10), whereby the target air back pressure $P_1$ is obtained by introducing the estimated impedance into the first line 301 illustrated in FIG. 11. Accordingly, a fail-safe can be achieved that enables the fuel cell 2 to be operated in the wet condition.

Eighth Control Example

Next, an eighth control example will be described with reference to FIGS. 14 and 15. The present control example relates to a control for prohibiting operating the fuel cell 2 in the dry condition in a case where the impedance of the fuel cell 2 cannot be measured. The eighth control example is an exception handling that is performed in place of the fifth and sixth control examples described earlier.

Here, cases where the impedance of the fuel cell 2 cannot be measured may include, in addition to a case where a sine-wave signal for impedance measurement cannot be superimposed onto the power system 6 as described earlier, a case where a current cannot be passed due to a high amount of charge (SOC) of the battery 62. Moreover, cases where the amount of charge of the battery 62 increases include a case where regenerative power from the traction motor 64 is charged into the battery 62 due to continuous descending by the vehicle 100.

As illustrated in FIG. 14, a fuel cell system 400 includes a timer 410 in addition to the configuration of the fuel cell system 1 illustrated in FIG. 1. The timer 410 is connected to the controller 7 and measures an impedance measurement interval of the impedance measuring unit 122. During the operation of the fuel cell 2, the impedance measuring unit 122 measures an impedance of the fuel cell 2 as needed and the controller 7 performs control so that the fuel cell 2 is operated in a desired operational state (dry condition, wet condition, or normal operation) while updating a measured value by the impedance measuring unit 122 as needed. The timer 410 measures the period of time (measurement interval) from an update of an impedance measured value to the next update thereof.

As illustrated in FIG. 15, during the execution of the dry operation (step S41), the impedance of the fuel cell 2 is measured by the impedance measuring unit 122 (step S42). Next, a determination is made on whether or not a measurement interval measured by the timer 410 is equal to or greater than a predetermined threshold (step S43). The predetermined threshold is preferably set by, for example, taking the capacity of the high-voltage DC/DC converter 61 into consideration and is set to, for example, 30 seconds.

When the measurement interval is equal to or shorter than the predetermined threshold (step S43: No), it is assumed that the impedance measured value is being normally updated by the impedance measuring unit 122. Based on the updated impedance, the control parameter is changed and the dry operation is continued (step S44). Note that, the dry operation is preferably performed as described earlier in the first to third examples using a method involving increasing the FC temperature with the cooling pump 42, the switching valve 45 and the like, increasing the supply flow rate of the oxidation gas by the compressor 14, reducing the supply pressure of the oxidation gas by the back-pressure regulating valve 16, or the like. Subsequently, branching occurs depending on the presence/absence of the system stop command (step S45) to either repeat an impedance measurement (step S42) or switch to a scavenging operation (step S46).

On the other hand, when the measurement interval is greater than the predetermined threshold (step S43: Yes), it is assumed that the impedance measuring unit 122 is unable to measure the impedance and the dry operation having been performed up to that point is prohibited (step S47). Subsequently, the fuel cell 2 is switched from the dry operation to the normal operation (step S48). The switch to the normal operation is preferably achieved by executing an operation that is the opposite of the first to third examples described earlier which concern the dry operation. For example, switching to the normal operation is preferably performed by reducing the supply flow rate of the oxidation gas by the compressor 14, increasing the supply pressure of the oxidation gas by the back-pressure regulating valve 16, reducing the rotation speed of the cooling pump 42, or the like in comparison to a dry operation. However, in step S48, a wetness control of the fuel cell 2 (third control example, fourth control example) is not performed.

As described above, according to the eighth control example, when the impedance cannot be measured during the dry operation and the measured value cannot be normally updated, the dry operation is prohibited and the fuel cell 2 is restored to the normal operation. Consequently, the prohibition of the dry operation can suppress the risk of excessive drying (a so-called dry-up) of the fuel cell 2 which exists when the dry operation is performed in a state where it is unclear whether the ion-exchange membrane of the fuel cell 2 is rather dry or rather wet. Therefore, even without having to estimate the water content of the fuel cell 2 when the impedance cannot be measured as is the case with the sixth control example, the fuel cell 2 can be operated in an appropriate state and fail-safe can be achieved.

Figure 1:
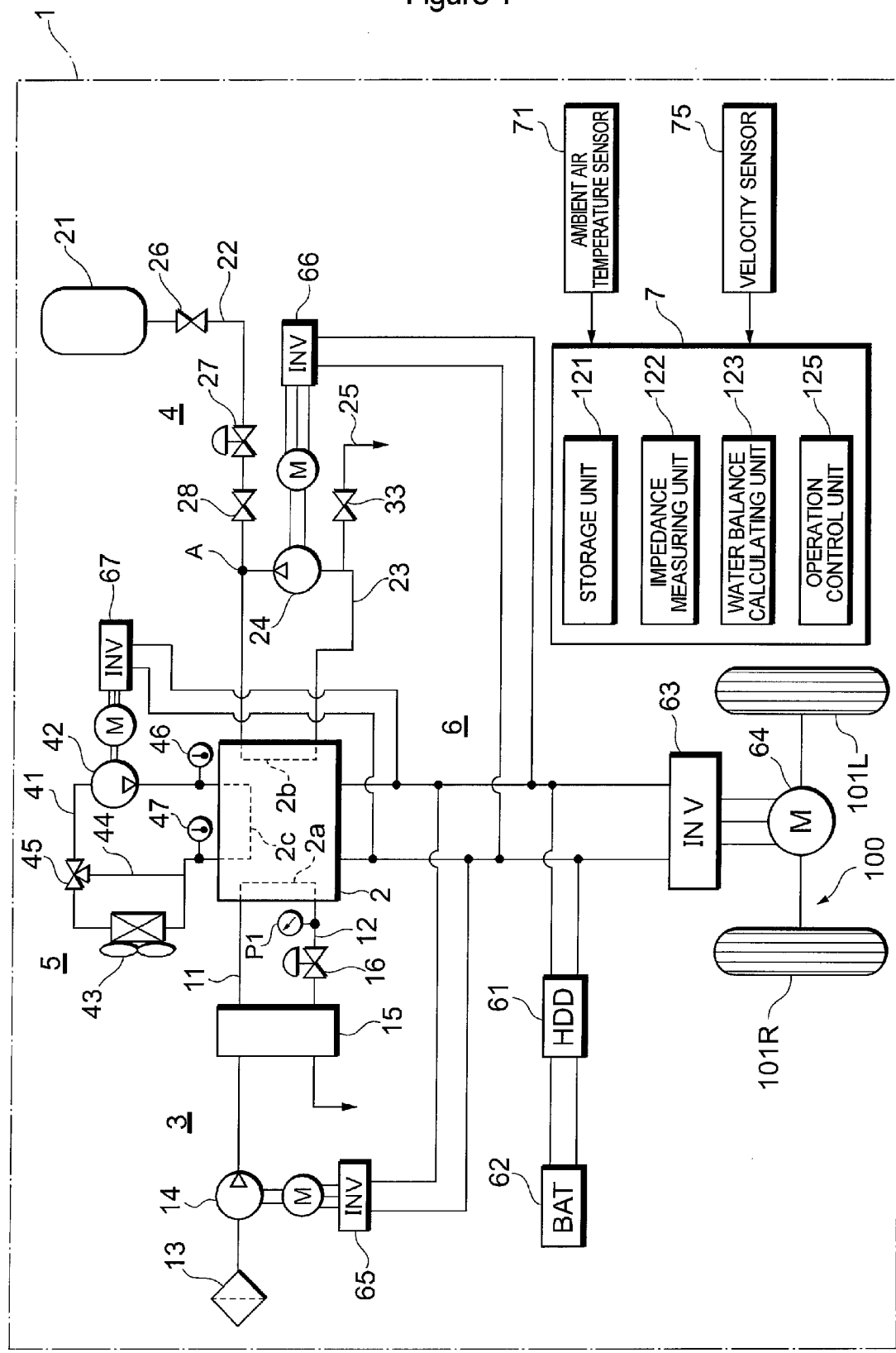
FIG. 1 is a configuration diagram of a fuel cell system according to an embodiment of the present invention.
Figure 2:
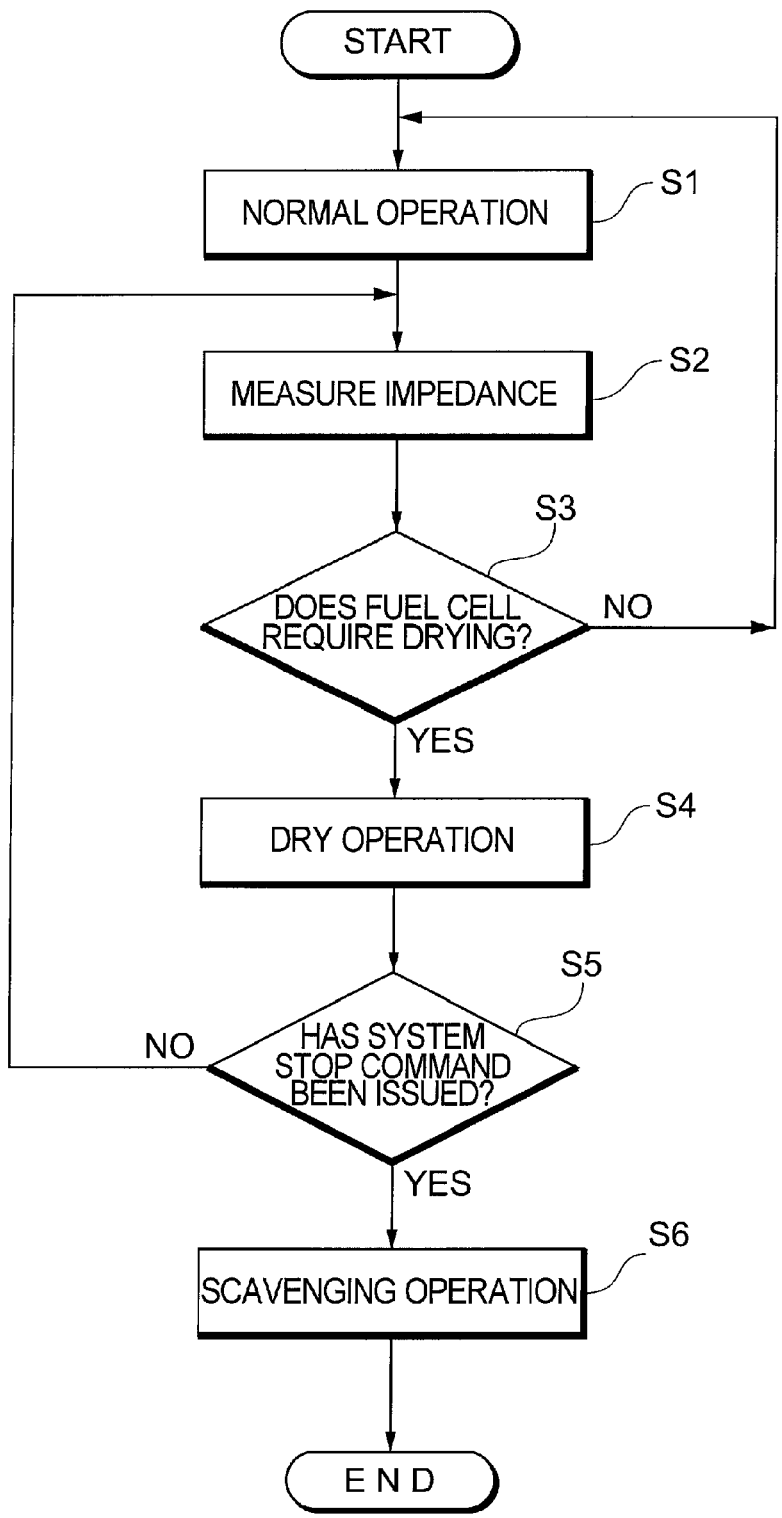
FIG. 2 is a flow chart illustrating a first control example of water content control of a fuel cell system according to an embodiment of the present invention.
Figure 3:
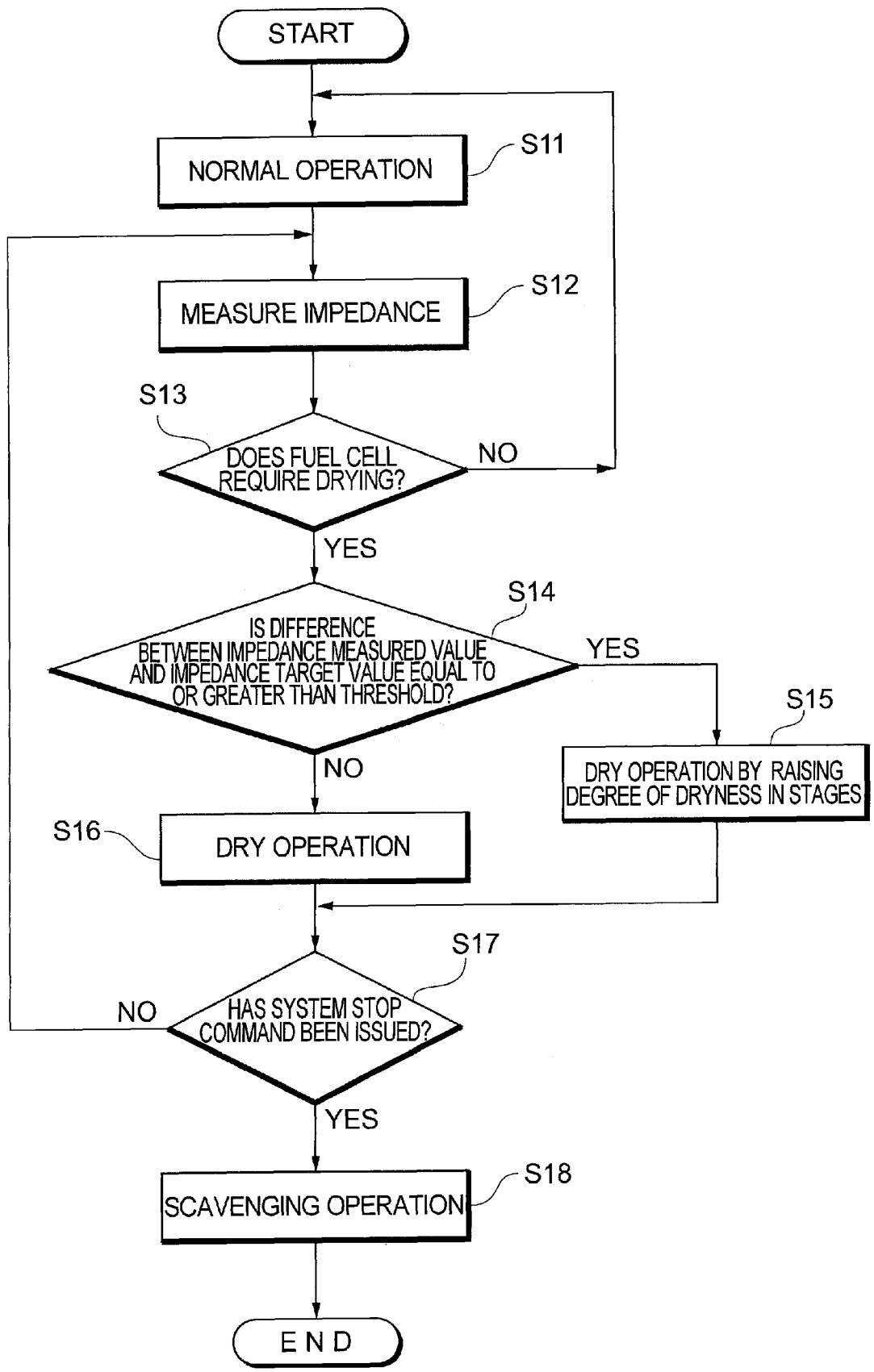
FIG. 3 is a flow chart illustrating a second control example of water content control of a fuel cell system according to an embodiment of the present invention.
Figure 4:
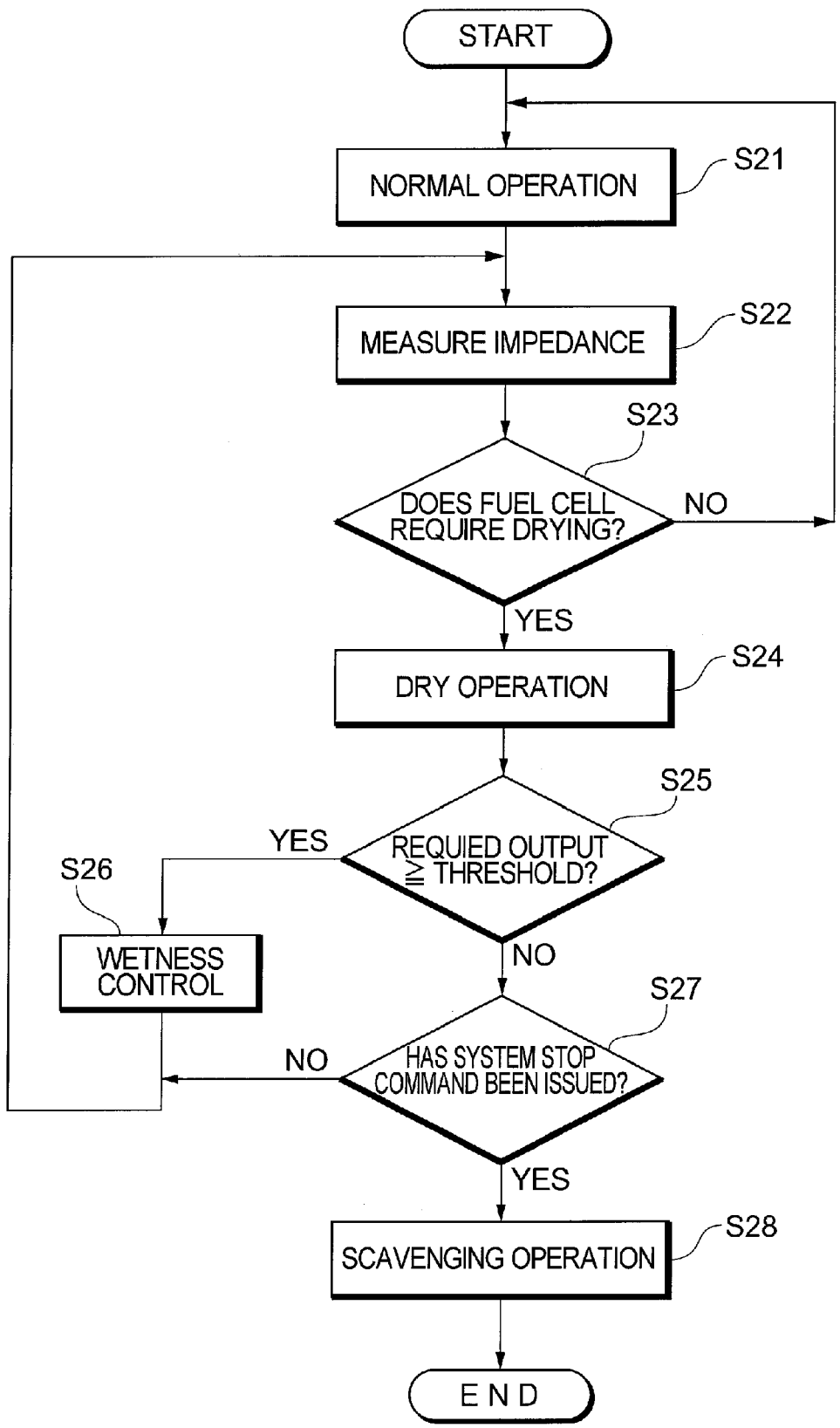
FIG. 4 is a flow chart illustrating a third control example of water content control of a fuel cell system according to an embodiment of the present invention.
Figure 5:
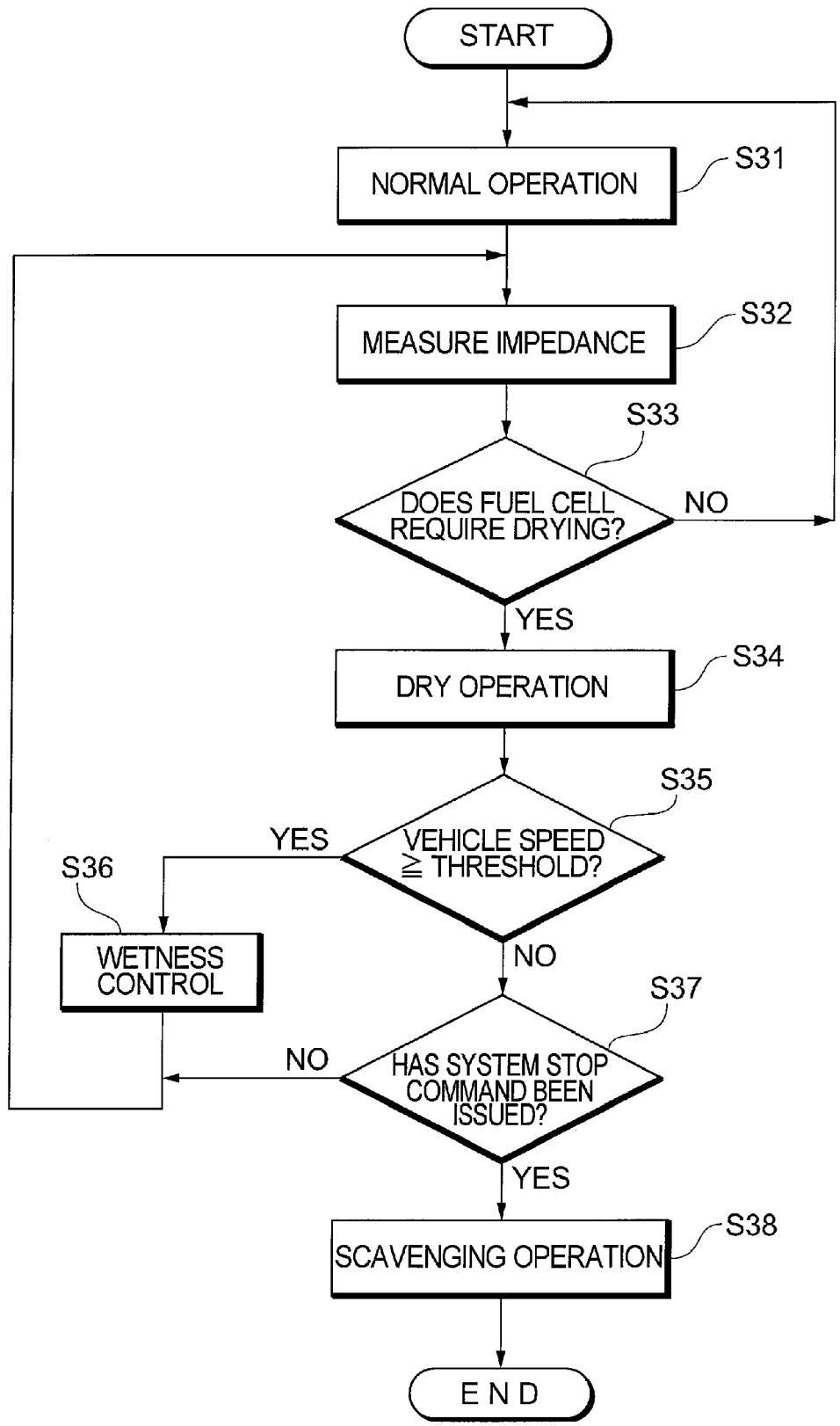
FIG. 5 is a flow chart illustrating a fourth control example of water content control of a fuel cell system according to an embodiment of the present invention.
Figure 6:
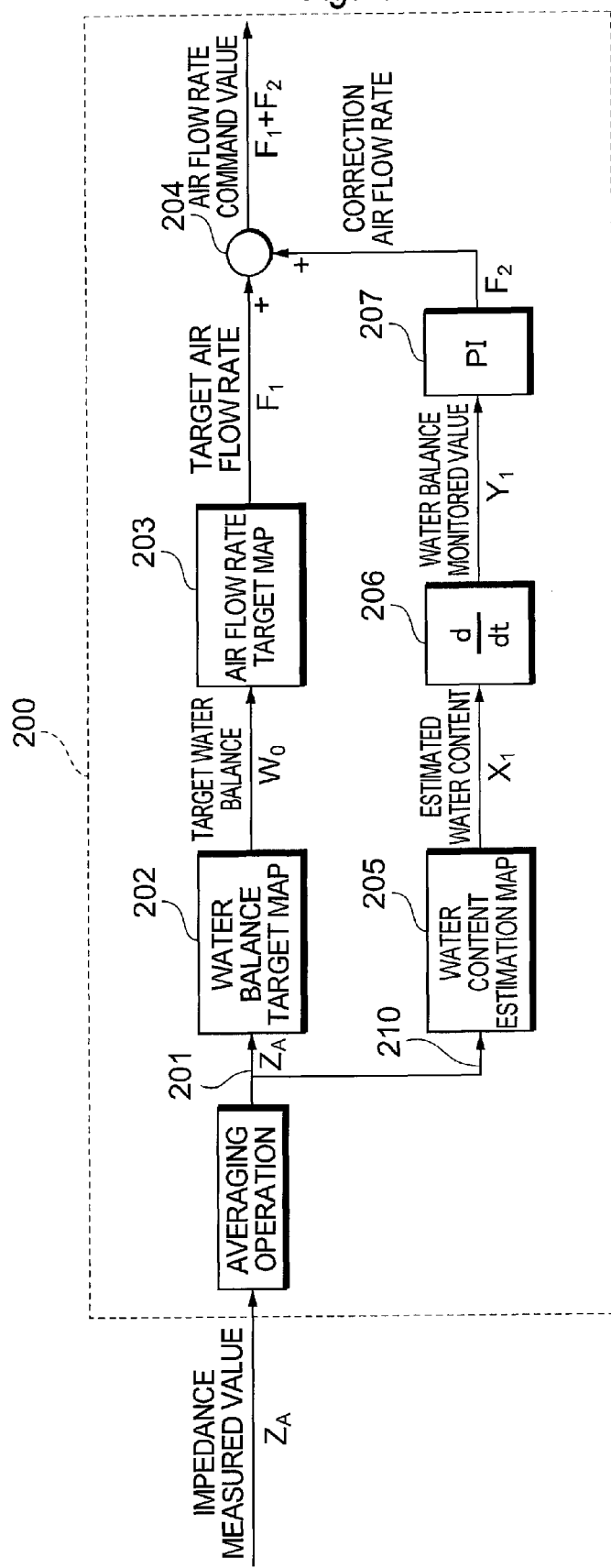
FIG. 6 is a block diagram illustrating a fifth control example of water content control of a fuel cell system according to an embodiment of the present invention.
Figure 7:
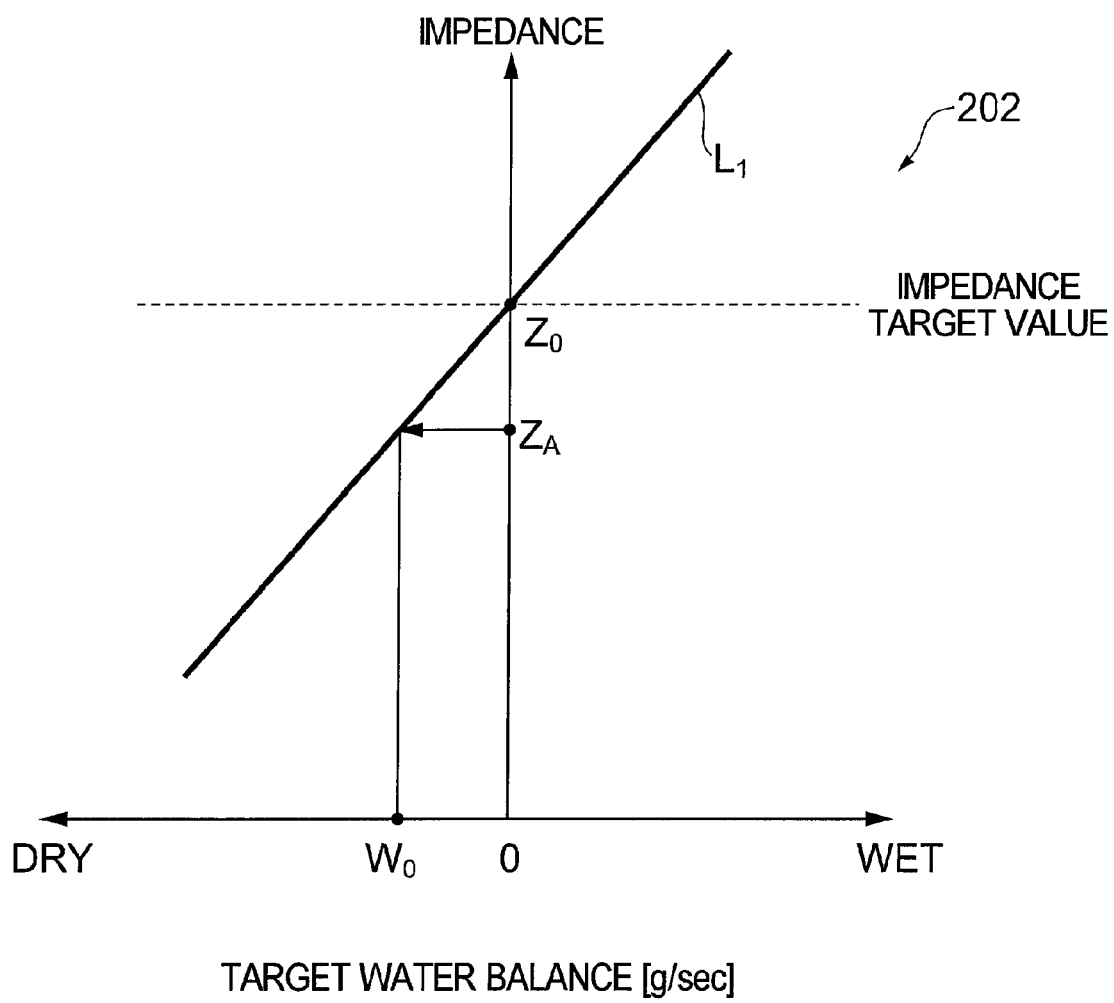
FIG. 7 is a water balance target map used in the fifth control example and which illustrates a relationship between an impedance of a fuel cell and a water balance target value on an air electrode-side of the fuel cell.
Figure 8:
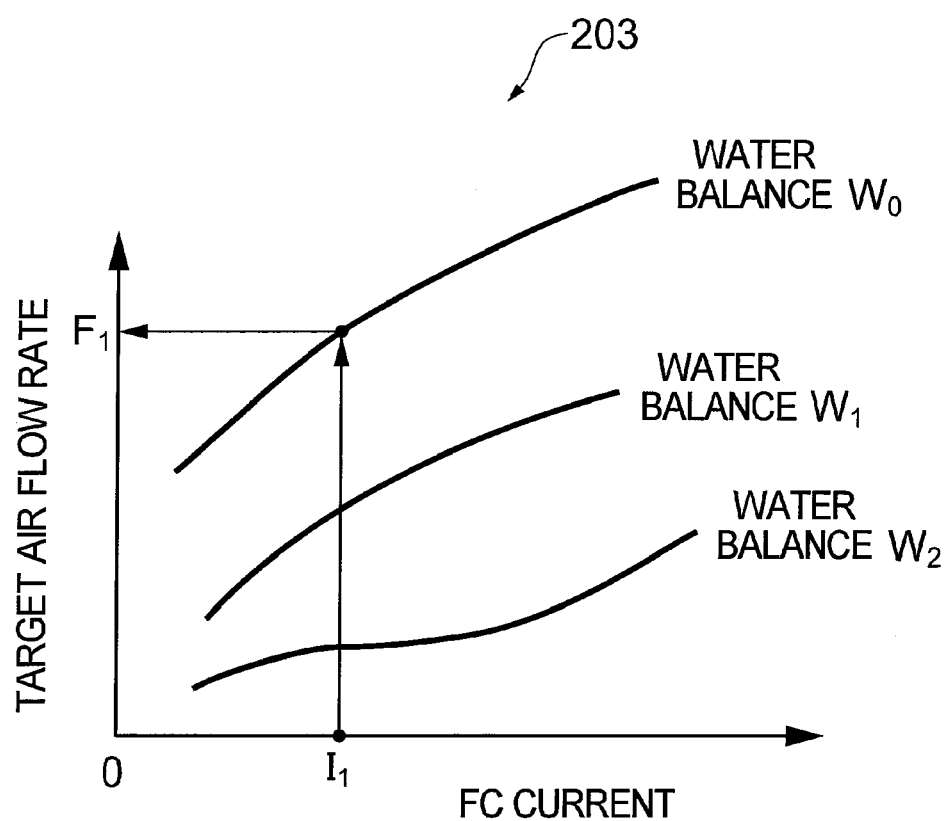
FIG. 8 is an air flow rate target map used in the fifth control example and which illustrates a relationship among a target air flow rate, an FC current, and a water balance.
Figure 9:
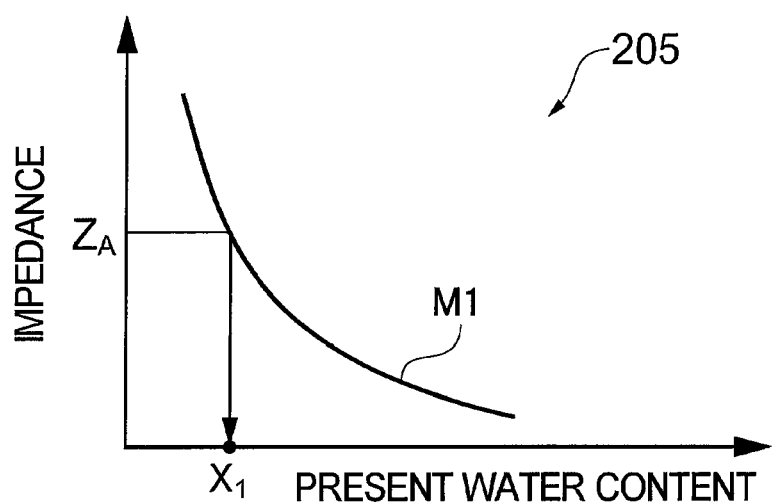
FIG. 9 is a water content estimation map used in the fifth control example and which illustrates a relationship between an impedance of a fuel cell and a water content of the fuel cell.
Figure 10:
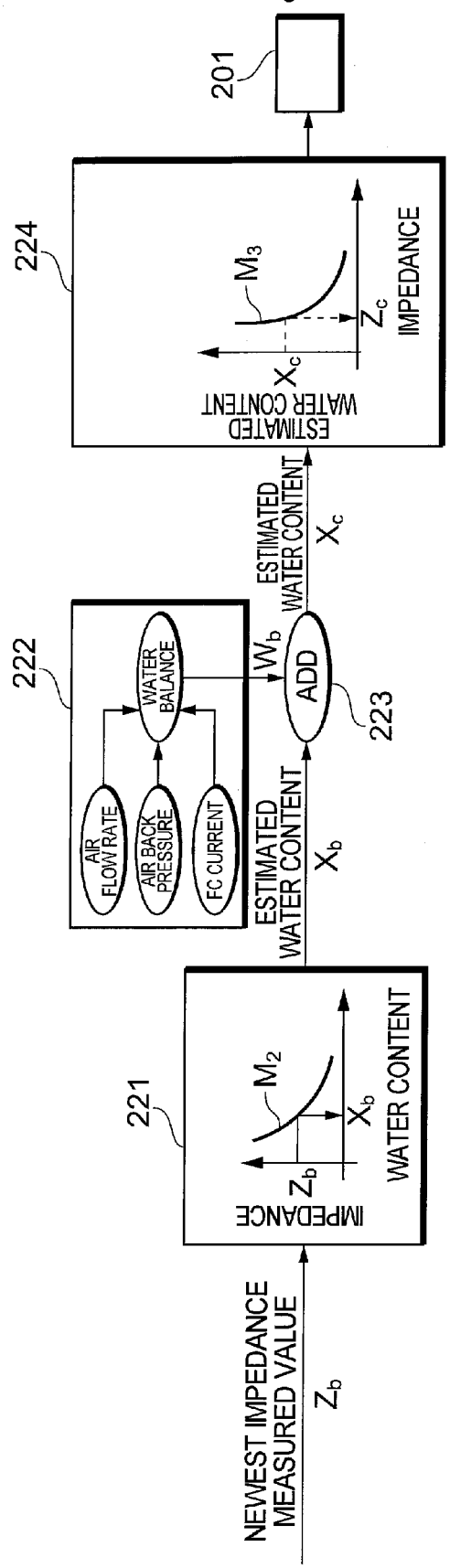
FIG. 10 is a block diagram illustrating a sixth control example of water content control of a fuel cell system according to an embodiment of the present invention.
Figure 11:
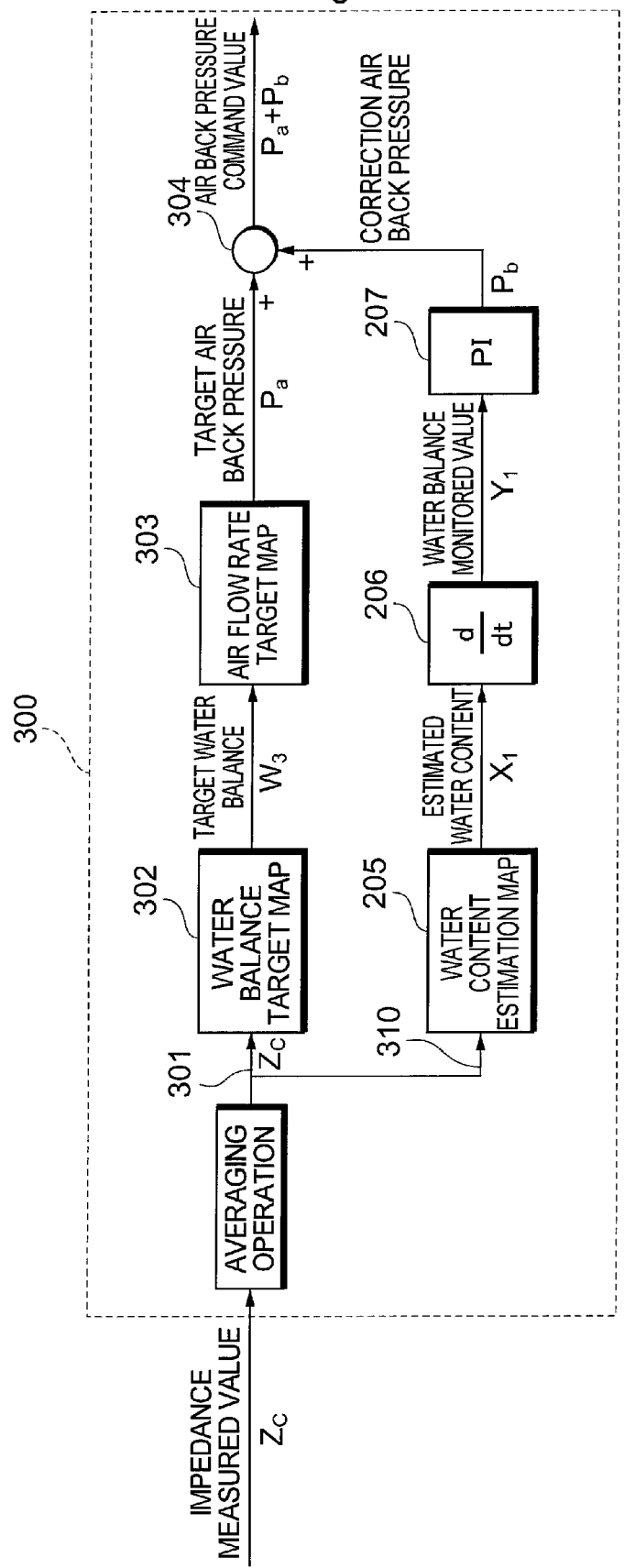
FIG. 11 is a block diagram illustrating a seventh control example of water content control of a fuel cell system according to an embodiment of the present invention.
Figure 12:
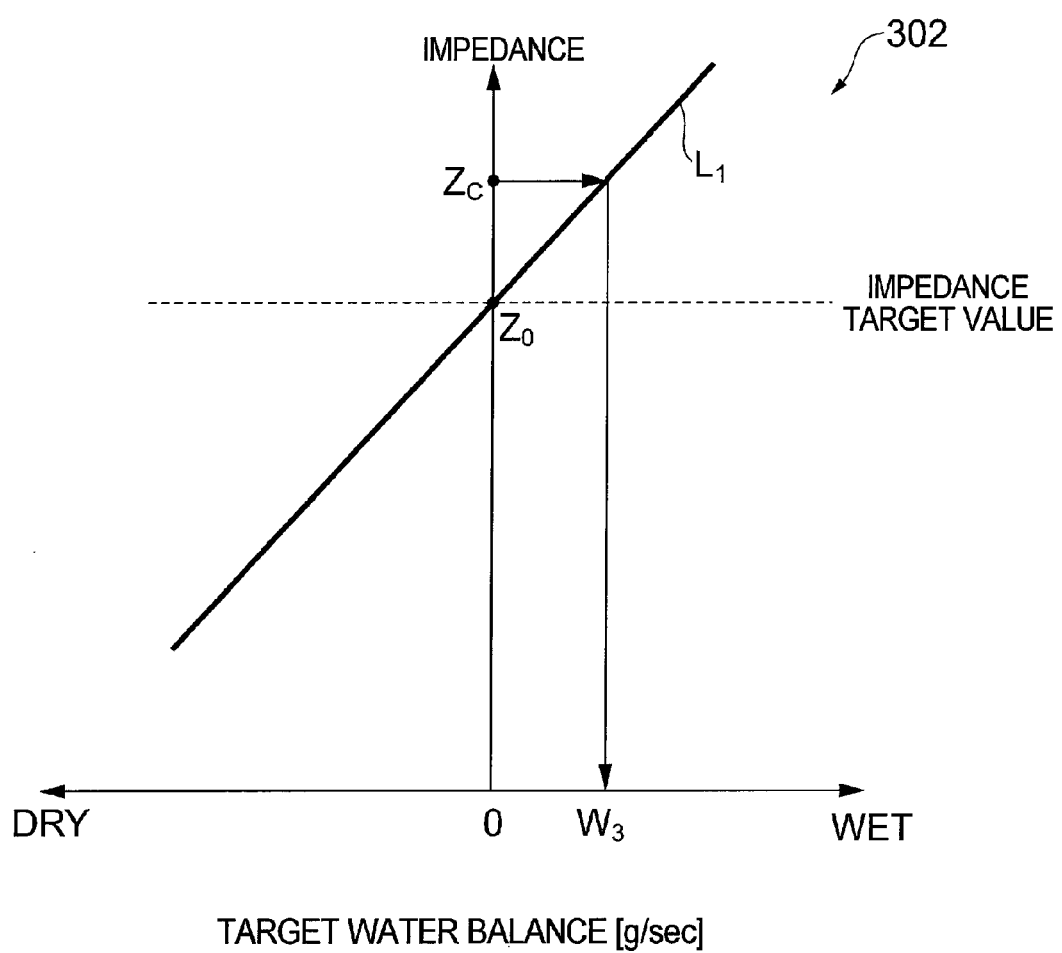
FIG. 12 is a water balance target map used in the seventh control example and which illustrates a relationship between an impedance of a fuel cell and a water balance target value on an air electrode-side of the fuel cell.
Figure 13:
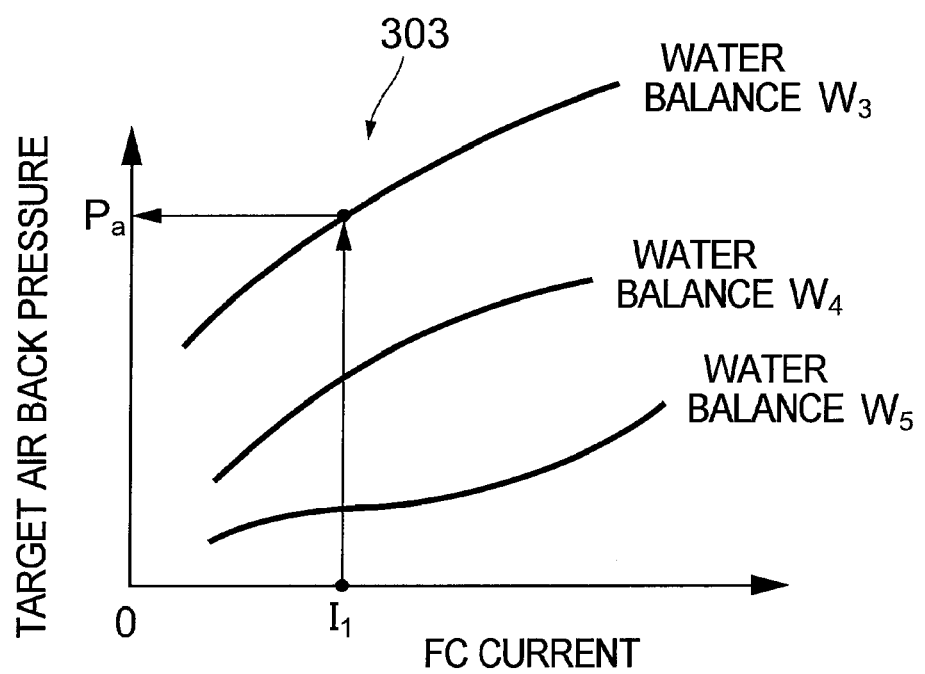
FIG. 13 is an air back pressure target map used in the seventh control example and which illustrates a relationship among a target air back pressure, an FC current, and a water balance.
Figure 14:
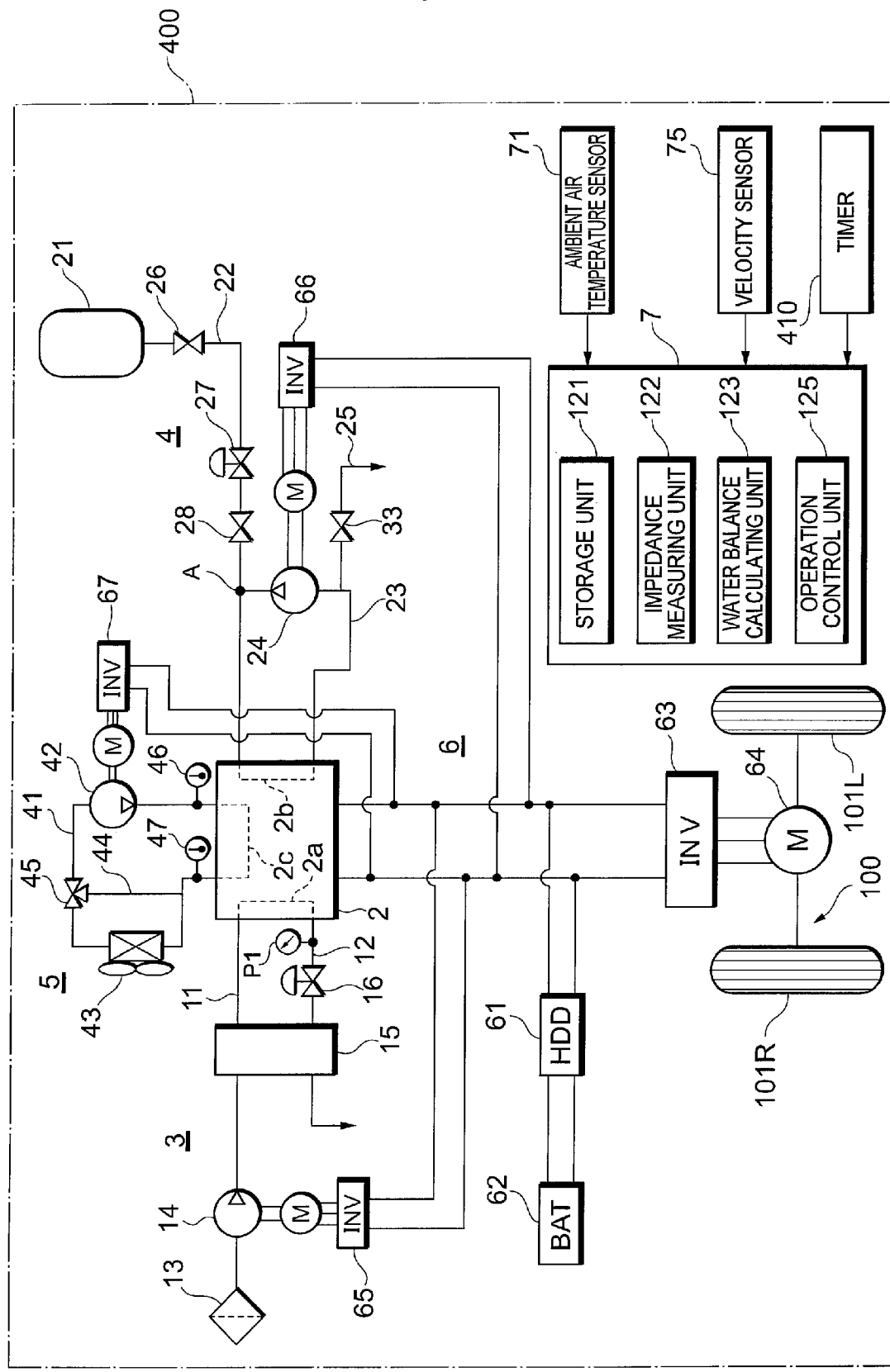
FIG. 14 is a configuration diagram of a fuel cell system according to an embodiment of the present invention related to an eighth control example of water content control.
Figure 15:
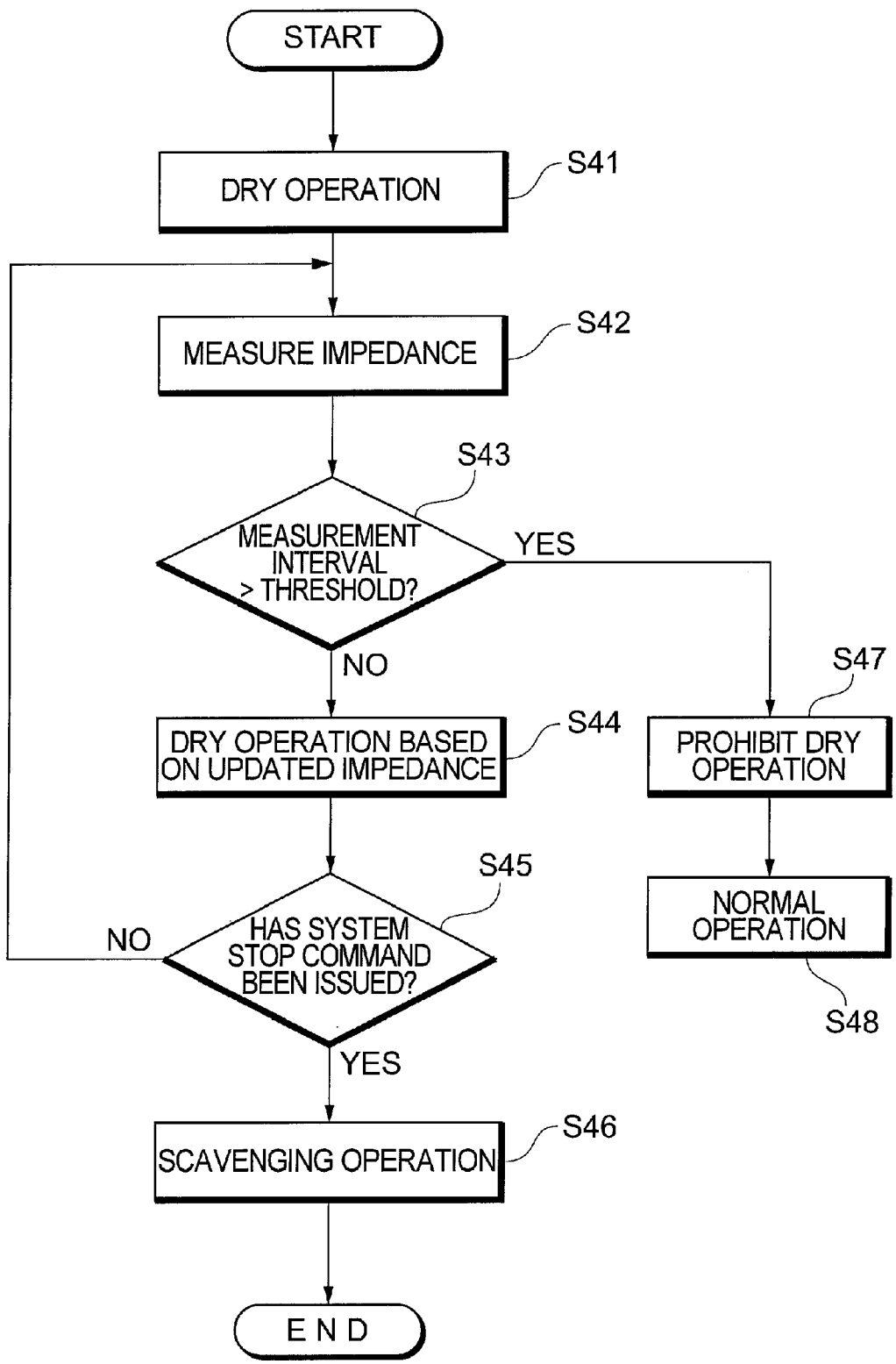
FIG. 15 is a flow chart illustrating the eighth control example of water content control of a fuel cell system according to an embodiment of the present invention.

The invention claimed is:
1. A fuel cell system comprising:
a fuel cell that can be operated in a dry condition, a normal condition and in a wet condition,
wherein in the normal condition, the fuel cell is operated in a state where air stoichiometric ratio is set equal to or greater than 1 in order to achieve an optimal power generating efficiency,
wherein the water content of the fuel cell is greater in the wet condition than the normal condition, and the water content of the fuel cell is greater in the normal condition than the dry condition; and
a controller that controls operations of the fuel cell,
wherein, in order to decrease the water content of the fuel cell in the normal condition, the controller is programmed to determine whether to operate the fuel cell in the dry condition before stopping a fuel cell system, and if the fuel cell is to be operated in the dry condition, the controller is further programmed to switch the fuel cell from operating in the normal condition to operating in the dry condition and thereby diminish power generating efficiency, and wherein during operating the fuel cell in the dry condition, the controller is further programmed to switch the fuel cell from operating in the dry condition to operating in the wet condition once a required output of the fuel cell cannot be satisfied by operating the fuel cell in the dry condition.

2. The fuel cell system according to claim 1, wherein the controller includes a measuring unit for measuring the impedance of the fuel cell in operation and a calculating unit for calculating a water balance of the fuel cell, and when the measuring unit is incapable of measuring the impedance of the fuel cell in operation, the controller is programmed to estimate a water content of the fuel cell using a water balance calculated by the calculating unit, and a water content of the fuel cell estimated from an impedance most recently measured by the measuring unit.

3. The fuel cell system according to claim 1, wherein the controller is programmed to prohibit operation of the fuel cell in a dry condition when the impedance of the fuel cell in operation cannot be measured.

4. The fuel cell system of claim 1, wherein the controller is further programmed to perform a water scavenging operation-before the shutdown of the fuel cell system.

* * * * *

UNITED STATES PATENT AND TRADEMARK OFFICE
CERTIFICATE OF CORRECTION

PATENT NO. : 8,951,685 B2
APPLICATION NO. : 12/741782
DATED : February 10, 2015
INVENTOR(S) : S. Aso It is certified that error appears in the above-identified patent and that said Letters Patent is hereby corrected as shown below:

In the specification

At column 12, line 32, change "measured value A" to -- measured value $Z_A$ --.

At column 13, line 18, change "water content of" to -- water content $X_C$ of --.

At column 13, line 27, change "impedance Z, is" to -- impedance $Z_C$ is --.

Signed and Sealed this
Twenty-seventh Day of October, 2015

Michelle K. Lee
*Director of the United States Patent and Trademark Office*